United States Patent
Wu et al.

(10) Patent No.: US 9,223,640 B2
(45) Date of Patent: Dec. 29, 2015

(54) STRATEGY BASED EVENT NOTIFICATION CHAIN

(75) Inventors: Guangnian Wu, Kanata (CA); Tibor Fasanga, Stittsville (CA)

(73) Assignee: Alcatel Lucent, Boulogne-Billancourt (FR)

( * ) Notice: Subject to any disclaimer, the term of this patent is extended or adjusted under 35 U.S.C. 154(b) by 312 days.

(21) Appl. No.: 13/567,640

(22) Filed: Aug. 6, 2012

(65) Prior Publication Data

US 2014/0040920 A1 Feb. 6, 2014

(51) Int. Cl.
*G06F 9/54* (2006.01)
*G06F 17/18* (2006.01)

(52) U.S. Cl.
CPC ...................................... *G06F 9/542* (2013.01)

(58) Field of Classification Search
None
See application file for complete search history.

(56) References Cited

U.S. PATENT DOCUMENTS

| | | | |
|---|---|---|---|
| 7,711,783 B1* | 5/2010 | Violleau et al. | 709/206 |
| 2003/0131141 A1* | 7/2003 | Springmeyer et al. | 709/310 |
| 2003/0163598 A1* | 8/2003 | Wilson et al. | 709/318 |
| 2008/0301175 A1* | 12/2008 | Applebaum et al. | 707/102 |
| 2009/0313265 A1* | 12/2009 | Sifry | 707/10 |
| 2012/0047506 A1* | 2/2012 | Maes | 718/100 |
| 2012/0210334 A1* | 8/2012 | Sutedja et al. | 719/314 |

OTHER PUBLICATIONS

Tomasz Masternak, et al. "ESB—Modern SOA Infrastructure" 2010.*

* cited by examiner

*Primary Examiner* — Lechi Truong
*Assistant Examiner* — Abdou Seye
(74) *Attorney, Agent, or Firm* — Kramer & Amado, P.C.

(57) ABSTRACT

Various exemplary embodiments relate to a method and related network node including one or more of the following: receiving, at the event bus from a sender, an indication of an event; identifying a plurality of listeners to which event notifications should be pushed based on the event; determining a sorted order for the plurality of listeners; and pushing, by the event bus, event notifications to the plurality of listeners in an order specified by the sorted order.

11 Claims, 4 Drawing Sheets

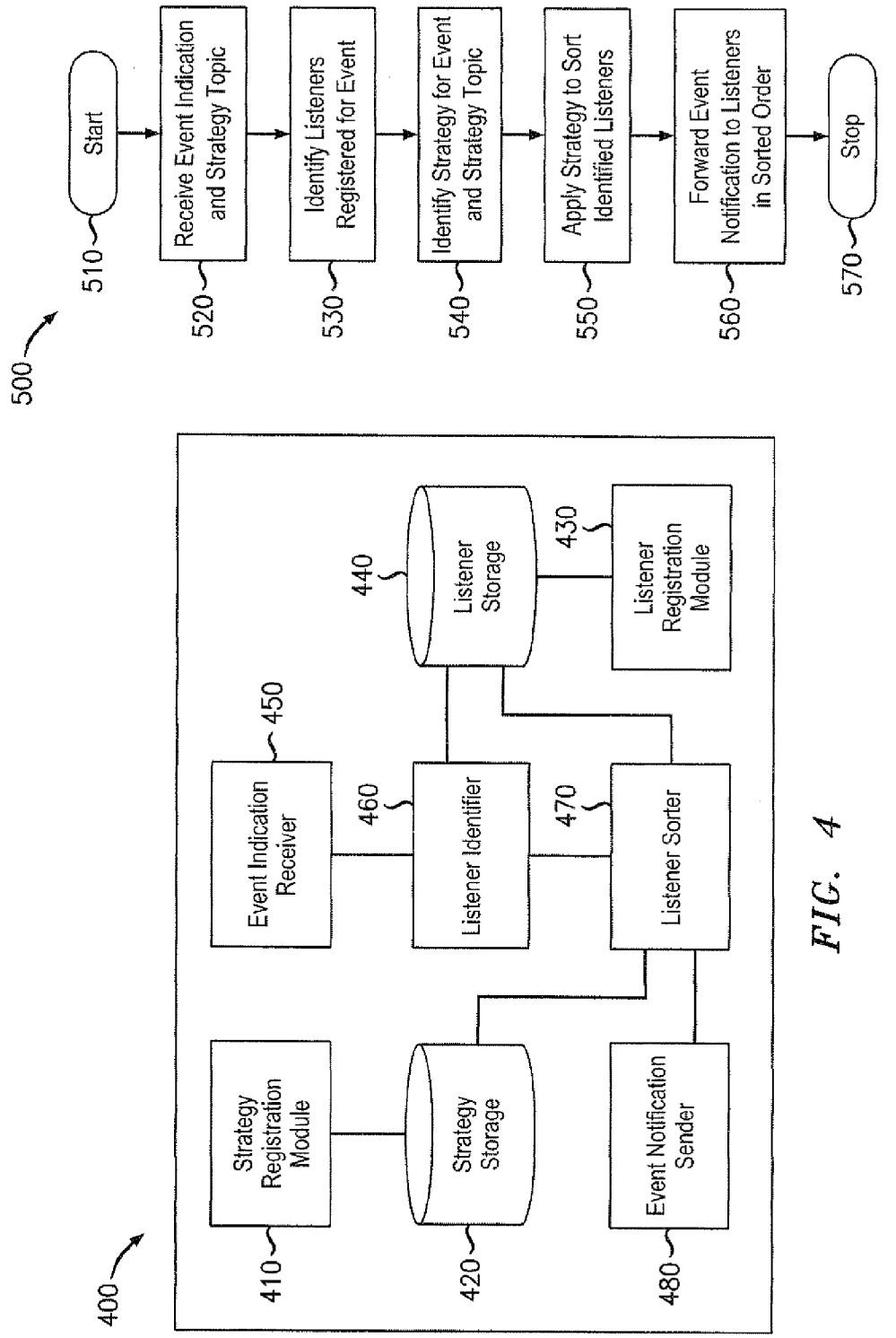

STRATEGY BASED EVENT NOTIFICATION CHAIN

TECHNICAL FIELD

Various exemplary embodiments disclosed herein relate generally to event processing.

BACKGROUND

Many applications today may be implemented as a collection of components that interact with each other. To support such interaction, these components may communicate with each other. For example, upon the occurrence of particular "events," such as a user clicking on a button of one component, the component where the event originates may send an "event notification" to one or more additional components. These other components may take such a notification as a cue to perform additional functions.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by an event bus for performing event notification, the method including: receiving, at the event bus from a sender, an indication of an event; identifying a plurality of listeners to which event notifications should be pushed based on the event; determining a sorted order for the plurality of listeners; and pushing, by the event bus, event notifications to the plurality of listeners in an order specified by the sorted order.

Various exemplary embodiments relate to a device including an event bus for performing event notification, the event bus including: an event indication receiver configured to receive an indication of an event from a sender; a listener identifier configured to identify a plurality of listeners to which event notifications should be pushed based on the event; a listener sorter configured to determine a sorted order for the plurality of listeners; and an event notification sender configured to push event notifications to the plurality of listeners in an order specified by the sorted order.

Various exemplary embodiments relate to a non-transitory machine-readable storage medium encoded with instructions for execution by an event bus for performing event notification, the medium including: instructions for receiving, at the event bus from a sender, an indication of an event; instructions for identifying a plurality of listeners to which event notifications should be pushed based on the event; instructions for determining a sorted order for the plurality of listeners; and instructions for pushing, by the event bus, event notifications to the plurality of listeners in an order specified by the sorted order.

Various embodiments are described wherein determining the sorted order for the plurality of listeners including: identifying a sorting strategy for the plurality of listeners; and applying the sorting strategy to determine the sorted order for the plurality of listeners.

Various embodiments are described wherein identifying the sorting strategy includes identifying the sorting strategy based on a strategy topic identified by the indication of the event.

Various embodiments are described wherein applying the sorting strategy includes evaluating criteria associated with the plurality of listeners.

Various embodiments additionally include receiving a registration message from a first listener of the plurality of listeners, wherein the registration message includes at least one criterion to be evaluated by the event bus.

Various embodiments additionally include receiving a strategy registration message from the sender, wherein the strategy registration message includes a definition for the sorting strategy.

Various embodiments are described wherein: the strategy registration message further specifies event type; and identifying the sorting strategy for the plurality of listeners includes determining that the event identified by the received indication corresponds to the specified event type.

BRIEF DESCRIPTION OF THE DRAWINGS

In order to better understand various exemplary embodiments, reference is made to the accompanying drawings, wherein:

FIG. 4 illustrates an exemplary event bus; and

FIG. 5 illustrates an exemplary method for providing an event notification to a number of listeners.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Inter-component or inter-application event notification can be implemented in various ways. One possibility is the use of an "event bus" to distribute event notifications. In such a system, a component that originates an event, or "sender," may send an indication of such event to an event bus component. The event bus may then determine what other components, or "listeners," have indicated a desire to receive a notification of such events. After identifying the appropriate listeners for the event, the event bus may push event notifications to each of the listeners.

Many event bus implementations, however, do not enable an application developer to specify a particular order in which listeners should receive event notifications. In such implementations, event notifications may be pushed to listeners in an arbitrary order, such as the order in which the listeners registered with the event bus. Accordingly, there is a need for an event bus that enables the specification of an event reporting order.

Figure 1:
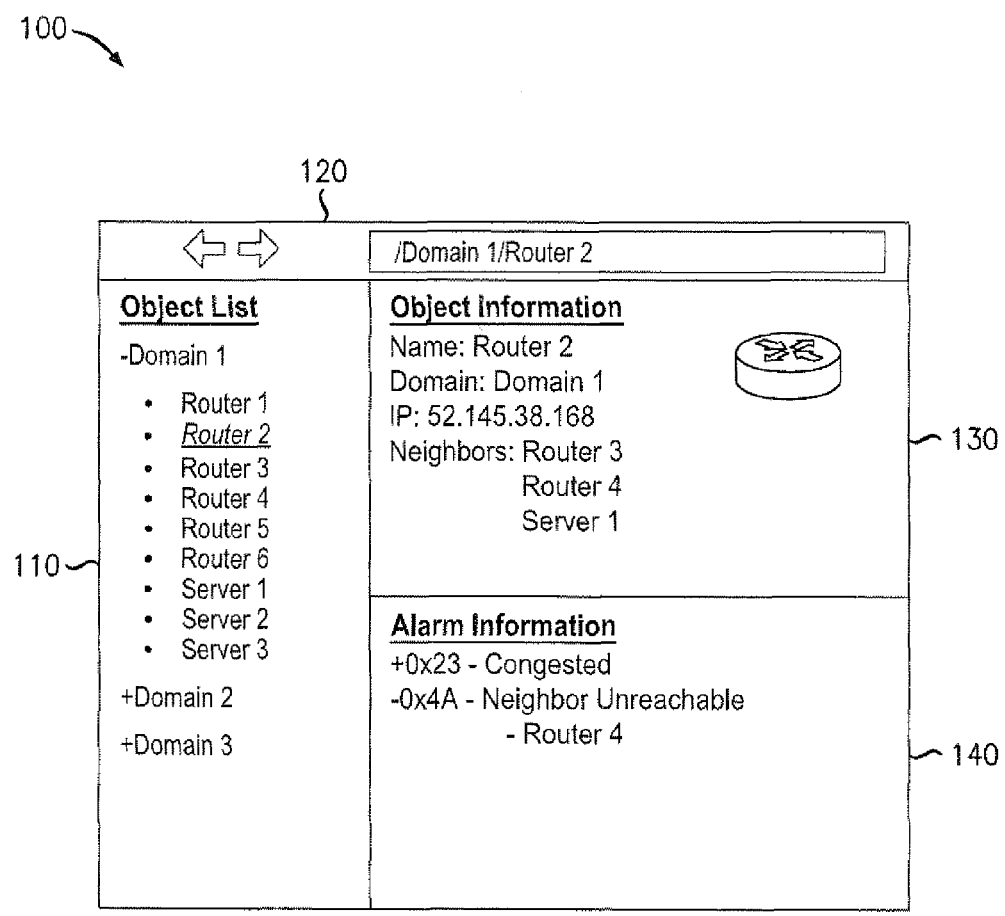
FIG. 1 illustrates an exemplary network management application utilizing an event bus.

FIG. 1 illustrates an exemplary network management application 100 utilizing an event bus. Network management application 100 may run on a dedicated network management system such as the Alcatel-Lucent 5620 Service Aware Manager (SAM). Alternatively, application 100 may run on a server, blade, personal computer, laptop, tablet, or any other computing device. Application 100 may provide a user with an interface for browsing various network objects, such as routers and servers, that belong to various networking domains. Application 100 may include various components such as an objects list component 110, navigation component 120, object information component 130, or alarm information component 140. Components 110, 120, 130, 140 may be implemented as processes executing on a processor or similar hardware device.

Components 110, 120, 130, 140 may communicate with each other via event notifications. For example, object list component 110 may receive a user selection of an object such as the "Router 3" object in "Domain 1." Object list component 110 may then, via an event bus (not shown), transmit an event notification to each of navigation component 120, object information component 130, or alarm information component 140. These listeners 120, 130, 140 may then update the displayed information to correspond to "Router 3". For example, navigation component 120 may display a path to "Router 3," object information component 130 may display information related to "Router 3," and alarm information component 140 may display any alarms associated with "Router 3." As another example, navigation component 120 may receive a "back button" selection and transmit an event notification to components 110, 130, 140. These listeners 110, 130, 140 may then update the displayed information to correspond to "Router 2."

In various situations, it may be desirable to provide event notifications among the components 110, 120, 130, 140 in a specified order. For example, the process of updating components 110, 120, 140 may be trivial while the process of updating component 130 may be relatively more process intensive and take more time. As such, it may be desirable to transmit an event notification to component 130 first, thereby ensuring that the four components 110, 120, 130, 140 will update displayed information at the same time. This may ensure that components 110, 120, 140 do not update first while object information component 130 may display old information or a blank panel. Various additional applications, components, or scenarios wherein ordering of event notifications would be desirable will be apparent.

Figure 2:
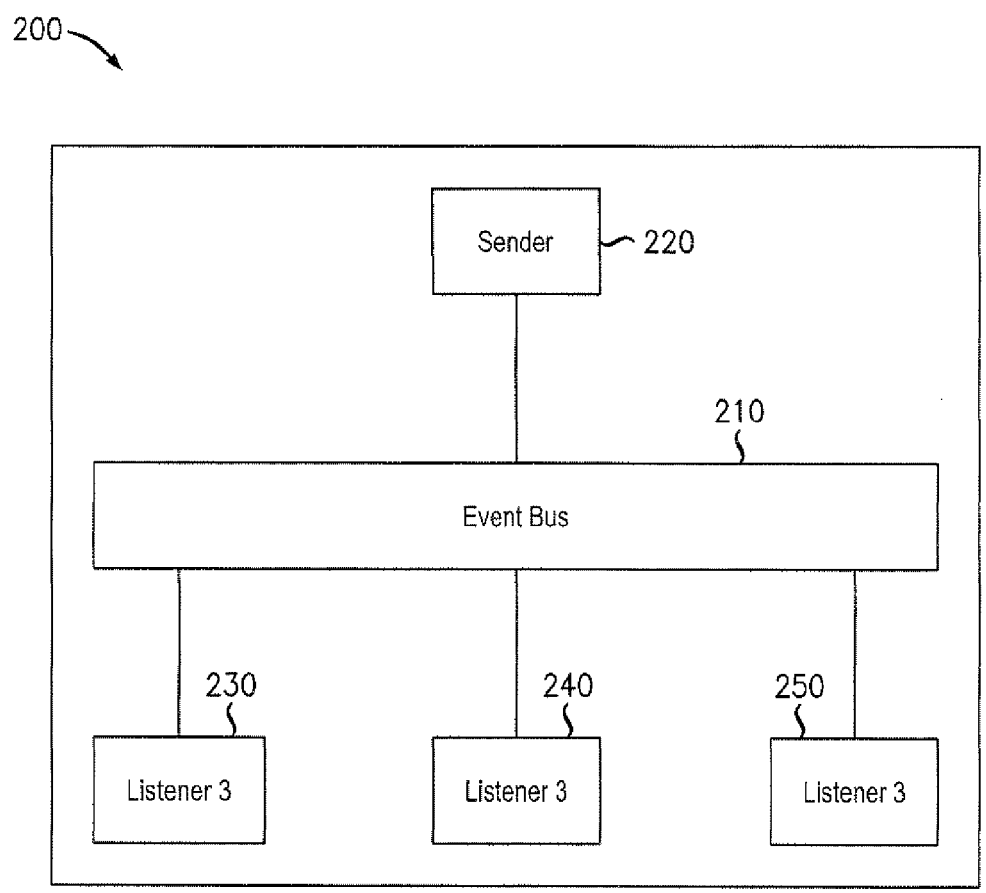
FIG. 2 illustrates an exemplary device implementing an event bus.

FIG. 2 illustrates an exemplary device 200 implementing an event bus 210. Device 200 may correspond to an Alcatel-Lucent 5620 SAM, a server, blade, personal computer, laptop, tablet, or any other computing device. Device 200 may include various hardware devices (not shown) such as a processor, memory, disk storage, network interfaces, or user interface devices. The various hardware devices may support event bus 210, sender 220, and listeners 230, 240, 250.

Event bus 210 may include hardware or executable instructions on a machine-readable storage medium configured to receive indications of events from sender 220 and transmit corresponding event notifications to listeners 230, 240, 250. Event bus 210 may transmit event notifications to listeners 230, 240, 250 in an order specified or otherwise determined using a sorting strategy, as will be described in greater detail below.

Sender 220 and listeners 230, 240, 250 may each be applications or components of an application. An event, such as a user selection or completion of a process, may originate at sender 220, which may then send an indication to event bus 210. Listeners 230, 240, 250 may then receive event notifications from event bus 210 based on a previous registration of each listener 230, 240, 250 as a listener for the event type. It will be understood that sender 220 may operate as a listener with respect to other events while each of listeners 230, 240, 250 may operate as senders with respect to other events. In various embodiments, device 200 may run application 100. In such embodiments, sender 220 may correspond to object list component 110. Further, listeners 230, 240, 250 may correspond to components 120, 130, 140, respectively.

Figure 3:
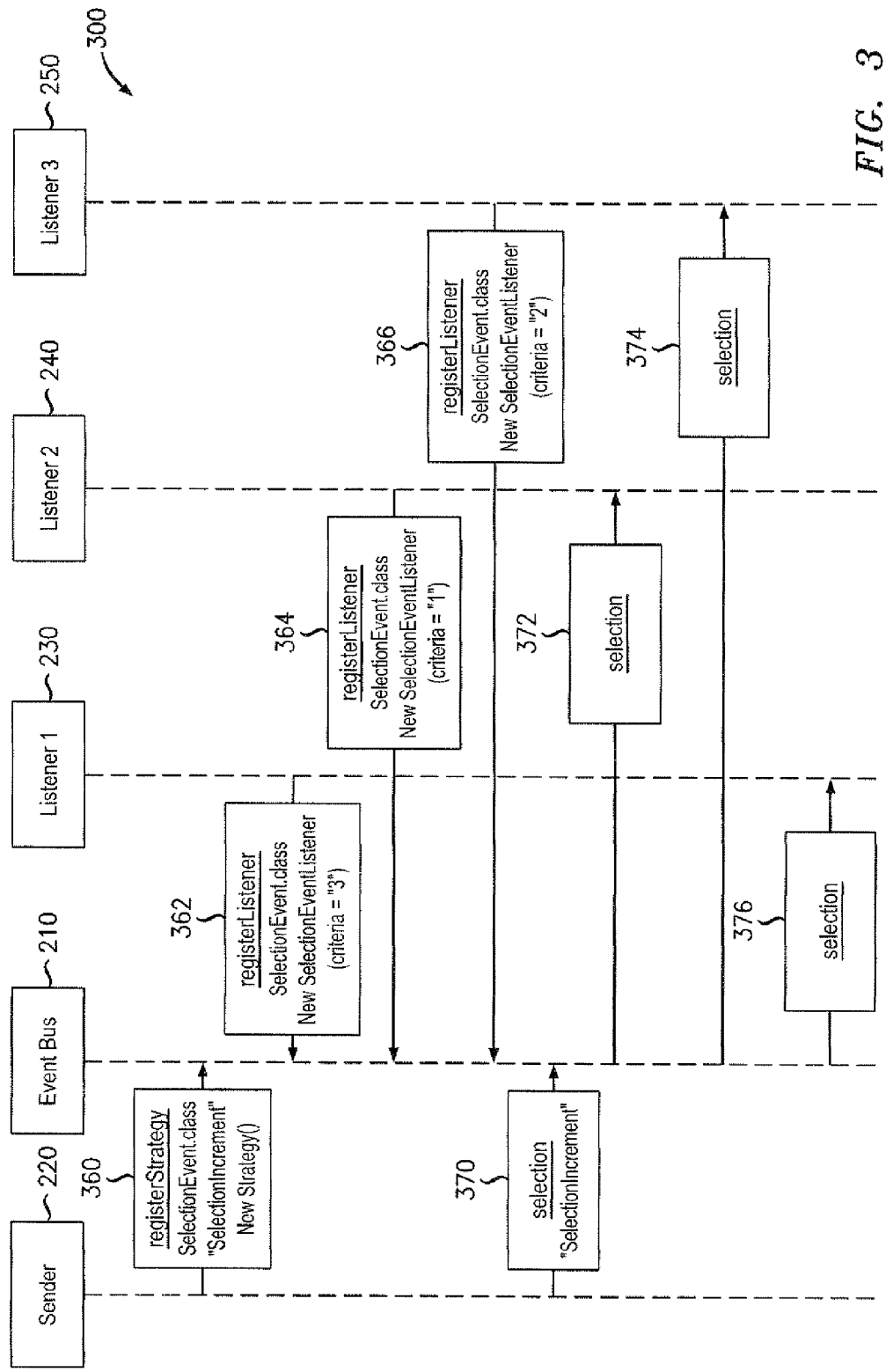
FIG. 3 illustrates an exemplary message exchange for providing an event notification to a number of listeners.

FIG. 3 illustrates an exemplary message exchange 300 for providing an event notification to a number of listeners. Message exchange 300 may occur between the various components of device 200 to provide ordered event notifications from sender 220 to listeners 230, 240, 250.

The message exchange may begin with sender 220 sending a strategy registration message 360 to event bus 210. For example, sender 220 may call a "registerStrategy" function. Strategy registration message 360 may include an indication as to which event type the strategy will apply, a name for the new strategy, and a function to be used as the sorting strategy. In the illustrated example, strategy registration message 360 may specify a new strategy named "SelectionIncrement" that applies to the event type corresponding to the "SelectionEvent.class" event class. The name of the strategy may also be referred to as a "strategy topic." Event bus 210, upon receiving message 360, may store the strategy function in association with the event type and strategy topic.

Next, listeners 230, 240, 250 may register themselves with the event bus as listeners by transmitting listener registration messages 362, 364, 366 to event bus 210, respectively. For example, each listener 230, 240, 250 may call a "registerListener" function. Listener registration messages 362, 364, 366 may each include an indication of the event type for which the listener wishes to receive notifications, and an event listener object to represent the listener including various criteria to be evaluated. Such criteria may include one or more attributes or other values that may be evaluated by a sorting strategy to determine an order in which the listeners 230, 240, 250 will receive event notifications. In the illustrated example, each listener registration message 363, 364, 366 may indicate that the respective listener 230, 240, 250 should receive notifications related to the event type corresponding to the "SelectionEvent.class" event class. The listener registration messages 363, 364, 366 may also include event listener objects that each include a "criteria" value. Event bus 210 may store these event listener objects in association with the specified event type for later evaluation. For example, the strategy registered by registration message 360 may order the listeners in ascending order of the "criteria" value specified in the listener registration messages 362, 364, 366.

According to the foregoing, the event bus enables run time registration of listeners and sorting strategies. By using the above-described registration messages or functions, a designer may dynamically configure an event bus to distribute various event notifications among appropriate applications or components and in a desired order.

Next, an event may originate at sender 220. For example, sender 220 may receive a user selection of a list item. Sender 220 may respond by sending an indication of the event 370 to event bus. The indication may indicate that the event is a selection event type and may specify a strategy topic of "SelectionIncrement" to be used. Based on the event type and strategy topic, event bus 210 may locate the sorting strategy previously stored after receipt of registration message 360. Applying this sorting strategy, event bus 210 may evaluate the listener criteria provided in listener registration messages 362, 364, 366 to determine an order in which listeners 230, 240, 250 should receive event notifications. Based on the strategy and the criteria, event bus 210 may send a first event notification 372 to listener 2 240, a second event notification 374 to listener 3 250, and a third event notification 376 to listener 1 230. In this manner, event bus may use previously registered strategies and listeners to distribute event notifications among listeners 230, 240, 250 in a desired order.

FIG. 4 illustrates an exemplary event bus 400. Event bus 400 may correspond to event bus 210. As such, event bus 400 may be configured to register sorting strategies, register listeners, and distribute event notifications among listeners in a desired order. Event bus may include a strategy registration module 410, strategy storage 420, listener registration module 430, listener storage 440, event indication receiver 450, listener identifier 460, listener sorter 470, and event notification sender 480.

Strategy registration module 410 may include hardware or executable instructions on a machine-readable medium configured to receive various sorting strategies for later use. Strategy registration module 410 may receive a message such as strategy registration message 360 from a sender. The message may include a strategy, event type, and strategy topic. Strategy registration module 410 may store the strategy in association with the event type and strategy topic in strategy storage 420 for later use.

Strategy storage 420 may be any machine-readable medium capable of storing one or more sorting strategies. Accordingly, strategy storage 420 may include a machine-readable storage medium such as read-only memory (ROM), random-access memory (RAM), magnetic disk storage media, optical storage media, flash-memory devices, and/or similar storage media. In various embodiments, strategy storage 420 may store one or more sorting strategies in association with an event type or a strategy topic. For example, strategy storage 420 may store a number of records that each include an event type field, a strategy topic field, and a sorting strategy field. The sorting strategy may be stored as programming code, pseudocode to be interpreted by the event bus 400, or any other form useful for storing a sorting strategy. Various other data structures for storing sorting strategies will be apparent.

Listener registration module 430 may include hardware or executable instructions on a machine-readable medium configured to receive listener registrations for later use. Listener registration module 430 may receive a message such as listener registration messages 362, 364, 366 from one or more listeners. The message may include an event type and a listener object including various criteria. Listener registration module 430 may store the listener object in association with the event type in listener storage 440 for later use.

Listener storage 440 may be any machine-readable medium capable of storing one or more listener objects. Accordingly, listener storage 440 may include a machine-readable storage medium such as read-only memory (ROM), random-access memory (RAM), magnetic disk storage media, optical storage media, flash-memory devices, and/or similar storage media. In various embodiments, listener storage 440 may store one or more listener objects in association with an event type. For example, listener storage 440 may store a number of records that each include an event type field and a listener object field. The listener object may store various criteria values and implement an "evaluateCriteria" function that returns a map of the criteria values for use by the event bus. Various other data structures for storing listener objects will be apparent.

Event indication receiver 450 may include hardware or executable instructions on a machine-readable medium configured to receive an indication of an event from a sender. Event indication receiver may receive a message such as event indication message 370 from a sender. The message may include an indication of an event type and a strategy topic. Event indication receiver 450 may pass this message or information to listener identifier 460.

Listener identifier 460 may include hardware or executable instructions on a machine-readable medium configured to identify one or more listeners to receive an event notification based on an event indication received by event indication receiver 450. Listener identifier may search listener storage 440 for any listener objects associated with the event type of the received indication. For example, if the received indication relates to a selection event, the listener identifier 460 may search listener storage 440 for records that relate to a selection event. After locating one or more listener objects, listener identifier 460 may pass the listener objects to listener sorter 470 for further processing.

Listener sorter 470 may include hardware or executable instructions on a machine-readable medium configured to sort a number of listeners that are to receive an event notification. Upon receiving a list of listeners to be sorted, listener sorter may locate an appropriate sorting strategy in strategy storage 420. In various embodiments, listener sorter may locate a strategy that matches the event type and specified strategy topic carried by the received indication. Next, the listener sorter 470 may evaluate the located sorting strategy to determine an order for the located listeners. This evaluation may include, as specified in the located search strategy, accessing various criteria associated with each of the listener objects. After determining an order for the list of listeners, listener sorter 470 may pass the listeners to event notification sender 480. For example, listener sorter 470 may pass an ordered list of listeners, or may pass each listener object in the determined order to event notification sender 480.

Event notification sender 480 may include hardware or executable instructions on a machine-readable medium configured to transmit event notifications to listeners in an order specified by listener sorter 470. Event notification sender 480 may receive identifications of one or more listeners from listener sorter 470. Thereafter, event notification sender may generate event notifications based on the received event indication, and transmit the notifications to the listeners in the order specified by the listener sorter 470. For example, event notification sender may send messages such as event notification messages 372, 374, 376.

FIG. 5 illustrates an exemplary method 500 for providing an event notification to a number of listeners. Method 500 may be performed by the components of event bus 400 such as, for example, event indication receiver 450, listener identifier 460, listener sorter 470, or event notification sender 480.

Method 500 may begin in step 510 and proceed to step 520 where the event bus may receive an indication of an event from a sender. The indication may specify the event type and a strategy topic to be used in sorting listeners. Next, in step 530, the event bus may identify one or more listeners that have previously registered with the event bus to receive notifications for events of the indicated type. In step 540, the event bus may identify a strategy to be applied to sort the listeners. This strategy may be identified using the indicated event type or strategy topic.

Next, in step 550, the event bus may apply the identified strategy to sort the listeners. Evaluation of the strategy may include reference to one or more criteria values for each listener. Such criteria values may include static values hard-coded into the system or dynamic values populated by the listeners at the time of registration. Such dynamic values may include current operating or performance parameters of the listener component. Finally, in step 560, the event bus may forward event notifications to each other listeners. The event notifications may be forwarded in the same order determined in step 550.

According to the foregoing, various embodiments enable applications to enable inter-component or inter-application notifications that are ordered. By enabling injection and use of various sorting strategies, the event bus may push event notifications to various listeners in a desired and non-arbitrary order.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by an event bus for performing event notification, the method comprising:
   receiving, at the event bus from a sender, an indication of an event;
   identifying a plurality of listeners to which event notifications should be pushed based on the event;
   identifying a sorting strategy of a plurality of available sorting strategies;
   applying the sorting strategy to determine a sorted order for pushing a plurality of event notifications to respective listeners of the plurality of listeners;
   pushing, by the event bus, the plurality of event notifications to the plurality of listeners in an order specified by the sorted order;
   wherein applying the sorting strategy comprises evaluating criteria associated with the plurality of listeners; and
   receiving a registration message from a first listener of the plurality of listeners, wherein the registration message includes at least one criterion to be evaluated by the event bus.

2. The method of claim 1, wherein identifying the sorting strategy comprises identifying the sorting strategy based on a strategy topic identified by the indication of the event.

3. The method of claim 1, further comprising:
   receiving a strategy registration message from the sender, wherein the strategy registration message includes a definition for the sorting strategy.

4. The method of claim 3, wherein:
   the strategy registration message further specifies event type; and
   identifying the sorting strategy for the plurality of listeners comprises determining that the event identified by the received indication corresponds to the specified event type.

5. A device including an event bus for performing event notification, the device comprising:
   a strategy storage configured to store a plurality, of sorting strategies;
   a memory; and
   a processor in communication with the memory, wherein the processor is configured to implement an event bus comprising:
   an event indication receiver configured to receive an indication of an event from a sender,
   a listener identifier configured to identify a plurality of listeners to which event notifications should be pushed based on the event,
   a listener sorter configured to:
   identify a sorting strategy of the plurality of sorting strategies, and
   apply the sorting strategy to determine a sorted order for pushing a plurality of event notifications to respective listeners of the plurality of listeners, and
   an event notification sender configured to push the plurality of event notifications to the plurality of listeners in an order specified by the sorted order;
   wherein, in applying the sorting strategy, the listener sorter is configured to evaluate criteria associated with the plurality of listeners;
   wherein the event bus further comprises: a listener storage configured to store an indication that the plurality of listeners are registered to receive an event notification and the criteria associated with the plurality of listeners; and
   a listener registration module configured to receive a registration message from a first listener of the plurality of listeners, wherein the registration message includes at least one criterion to be evaluated by the event bus.

6. The device of claim 5, wherein, in identifying the sorting strategy, the listener sorter is configured to identify the sorting strategy based on a strategy topic identified by the indication of the event.

7. The device of claim 5, wherein the event bus further comprises a strategy registration module configured to:
   receive a strategy registration message from the sender, wherein the strategy registration message includes a definition for the sorting strategy; and store the definition of the sorting strategy in the strategy storage.

8. The device of claim 7, wherein:

the strategy registration message further specifies event type; and in identifying the sorting strategy, the listener sorter is configured to determine that the event identified by the received indication corresponds to the specified event type.

9. A non-transitory machine-readable storage medium encoded with instructions for execution by an event bus for performing event notification, the medium comprising:

instructions for receiving, at the event bus from a sender, an indication of an event;

instructions for identifying a plurality of listeners to which event notifications should be pushed based on the event;

instructions for identifying a sorting strategy, of a plurality of available sorting strategies;

instructions for applying the sorting strategy to determine a sorted order for pushing a plurality of event notifications to respective listeners of the plurality of listeners;

instructions for pushing, by the event bus, event notifications to the plurality of listeners in an order specified by the sorted order;

wherein the instructions for applying the sorting strategy comprise instructions for evaluating criteria associated with the plurality of listeners; and instructions for receiving a registration message from a first listener of the plurality of listeners, wherein the registration message includes at least one criterion to be evaluated by the event bus.

10. The non-transitory machine-readable storage medium of claim 9, wherein the instructions for identifying the sorting strategy comprise instructions for identifying the sorting strategy based on a strategy topic identified by the indication of the event.

11. The non-transitory machine-readable storage medium of claim 9, further comprising:

instructions for receiving a strategy registration message from the sender, wherein the strategy registration message includes a definition for the sorting strategy.

* * * * *